E. M. MORGAN.
Grain-Drill.
No. 216,572. Patented June 17, 1879.
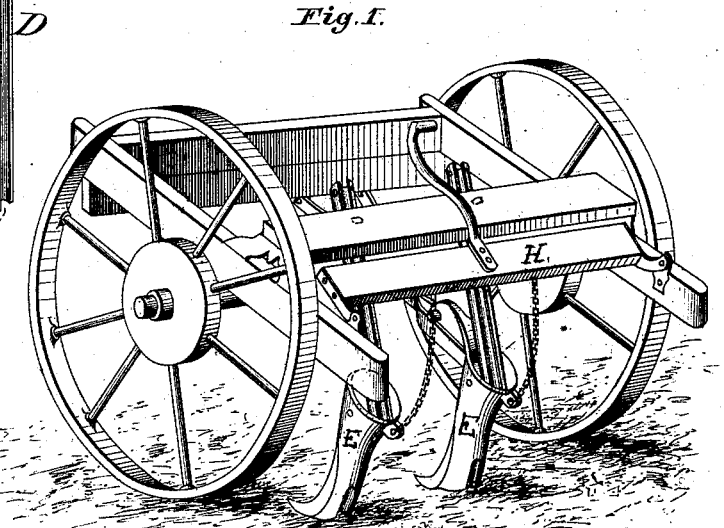
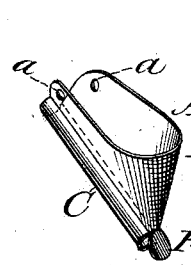
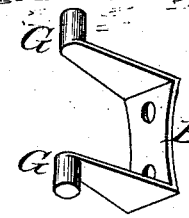
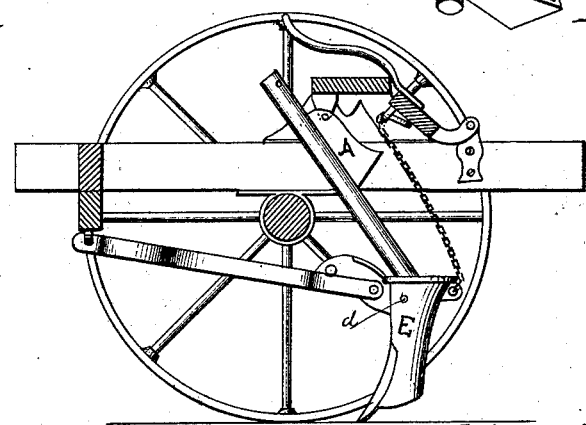
Attest.
Inventor.
Elias M. Morgan

UNITED STATES PATENT OFFICE.

ELIAS M. MORGAN, OF BELLEVILLE, ILLINOIS, ASSIGNOR TO HENRY RENTCHLER, OF SAME PLACE.

IMPROVEMENT IN GRAIN-DRILLS.

Specification forming part of Letters Patent No. 216,572, dated June 17, 1879; application filed January 22, 1878.

*To all whom it may concern:*

Be it known that I, ELIAS M. MORGAN, of Belleville, St. Clair county, State of Illinois, have invented certain new and useful Improvements in Seeding - Machines or Grain-Drills; and I do hereby declare the following to be a full, clear, and exact description of the invention, reference being had to the accompanying drawings, which form part of this specification.

Figure 1 is a perspective view of my invention. Fig. 2 is a side or longitudinally-sectional view. Fig. 3 is a conducting-tube. Fig. 4 is a funnel, and Fig. 5 is a hanger included in my invention.

My invention consists in improvements in the funnels and conducting-tubes for carrying grain from the hopper of a grain-drill to the hoe and thence into the ground.

The funnel A is attached to the bottom of the hopper by means of a hanger, B, (substantially shown in Fig. 5,) and has a tubular under side, C, so as to permit the conducting-tube D (shown in Fig. 3) to slide on it, and forms a support of the forward end of the conducting-tube. This tubular side of the funnel, Fig. 4, is the channel for the grain in its descent from the hopper into the conducting-tube, Fig. 3, which connects at its lower end to the top of the tooth or hoe E. At the lower end of the funnel is a circular pendant or deflector, F, that deflects the grain into the conducting-tube and prevents it from bouncing out. This pendant F is used to diminish the outlet of the tubular under side of the funnel, so as to equalize the flow of the grain into the conducting-tube.

The hanger, Fig. 5, has lateral pivot-projections G, to which the funnel is attached by means of perforations $a$ in its sides, near the upper edges. This pivotal connection of the funnel with the hanger allows the funnel to adjust to irregular movements of the conducting-tube, caused by the passage of the hoe through the ground.

The conducting-tube, Fig. 3, has a slot, $b$, in it, to allow it to move on the tubular side of the funnel, and at its lower end is a clasp, $c$, that takes hold of a wooden pin, $d$, through the top of the hoe.

The conducting-tube is sufficiently long to allow the hoe to adjust to the unevenness of the ground without becoming disconnected with the funnel. The funnel swings in the hanger-pivots, and adjusts to the movements of the conducting-tube.

H is the hopper-bottom.

Having fully described my invention, that which I claim is—

1. The combined funnel and tube, in combination with the slotted tube, for the purpose of allowing the slotted tube to adjust up and down on the funnel-tube.

2. The combined funnel and deflector, in combination with the slotted tube, for the purpose of conducting, guiding, and regulating the flow of the grain into the tube.

3. The combination and arrangement of the hanger, the combined funnel-tube and deflector, and slotted tube with the hoe, as and for the purposes specified.

In testimony that I claim the foregoing I hereunto set my hand this 12th day of January, 1878.

ELIAS M. MORGAN.

Witnesses:
WORDEN P. PENN,
WM. P. SHENNAN.